United States Patent
Umayabashi et al.

(10) Patent No.: US 9,369,359 B2
(45) Date of Patent: Jun. 14, 2016

(54) DIAGNOSTIC SYSTEM

(75) Inventors: Masaki Umayabashi, Tokyo (JP); Akira Sakurai, Tokyo (JP); Zhenlong Cui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 109 days.

(21) Appl. No.: 14/344,367

(22) PCT Filed: Sep. 10, 2012

(86) PCT No.: PCT/JP2012/073019
§ 371 (c)(1),
(2), (4) Date: Mar. 12, 2014

(87) PCT Pub. No.: WO2013/042564
PCT Pub. Date: Mar. 28, 2013

(65) Prior Publication Data
US 2014/0341044 A1 Nov. 20, 2014

(30) Foreign Application Priority Data
Sep. 20, 2011 (JP) .................. 2011-204592

(51) Int. Cl.
*H04L 1/00* (2006.01)
*H04L 12/26* (2006.01)

(52) U.S. Cl.
CPC ........ *H04L 43/0811* (2013.01); *H04L 43/0852* (2013.01)

(58) Field of Classification Search
CPC ................... H04L 43/0811; H04L 43/0852
USPC ....................................................... 370/241
See application file for complete search history.

(56) References Cited

U.S. PATENT DOCUMENTS

| 2004/0052257 A1* | 3/2004 | Abdo | H04L 12/2602 370/392 |
|---|---|---|---|
| 2008/0095044 A1* | 4/2008 | Kawaguchi | H04L 12/42 370/218 |

FOREIGN PATENT DOCUMENTS

| CN | 101242321 A | 8/2008 |
|---|---|---|
| JP | 2004-356854 A | 12/2004 |
| JP | 2005-328164 A | 11/2005 |
| JP | 2008-28801 A | 2/2008 |

(Continued)

OTHER PUBLICATIONS

ITU-T, "Series Y: Global Information Infrastructure, Internet Protocol Acpects and Next-Generation Networks; Internet protocol aspects-Operation, administration and maintenance; OAM functions and mechanisms for Ethernet based networks", International Telecommunication Union, Telecommunication Standardization Sector of ITU, Y.1731, Feb. 2008, Cited in the Specification (p. 2, paragraph [0011]).

(Continued)

*Primary Examiner* — Sai-Ming Chan

(57) ABSTRACT

A transmission source node transmits diagnostic frames where a TTL value is set to the number of hops that is counted until an intermediate node. A relay node decrements the TTL value of the received diagnostic frames, counts the number of diagnostic frames where the decremented TTL value is 0, and recognizes continuity between the transmission source node and the relay node based on the number of transmitted diagnostic frames transmitted from the transmission source node and the number of diagnostic frames where the decremented TTL value is 0.

15 Claims, 14 Drawing Sheets

(56) References Cited

FOREIGN PATENT DOCUMENTS

| | | |
|---|---|---|
| JP | 2008-244870 A | 10/2008 |
| JP | 2010-68052 A | 3/2010 |
| JP | 2010-199742 A | 9/2010 |
| JP | 2010-287939 A | 12/2010 |
| WO | 2011/055837 A1 | 5/2011 |

OTHER PUBLICATIONS

Martin Vigoureux et al., "Requirements for Operations, Administration, and Maintenance (OAM) in MPLS Transport Networks", 3-refc5860.txt, Internet Engineering Task Force (IETF), RFC 5860, ISSN: 2070-1721, May 2010, pp. 1-17. Cited in the Specification (p. 2, paragraph [0011]).

Italo Busi et al., "Operations, Administration and Maintenance Framework for MPLS-based Transport Networks", draft-ietf-mpls-tp-oam-framework-11.txt, MPLS Working Group, Feb. 11, 2011, pp. 1-64. Cited in the Specification (p. 2, paragraph [0011]).

International Search Report for PCT Application No. PCT/JP2012/073019, mailed on Nov. 27, 2012.

Chinese Office Action for CN Application No. 201280045791.9 issued on Mar. 28, 2016 with English Translation.

* cited by examiner

DIAGNOSTIC SYSTEM

This application is a National Stage Entry of PCT/JP2012/073019 filed on Sep. 10, 2012, which claims priority from Japanese Patent Application 2011-204592 filed on Sep. 20, 2011, the contents of all of which are incorporated herein by reference, in their entirety.

TECHNICAL FIELD

The present invention relates to a diagnostic system for diagnosing a communication system that performs packet data communication, a transmission source node, a relay node, an input line card, an output line card, a diagnostic method, and a program.

BACKGROUND ART

Recently, IP/Ethernet (registered trademark, similar hereinafter) has been applied in user traffic. Accordingly, to efficiently accommodate the traffic, progress has been achieved in packetizing a signal to be communicated for a communication network, especially a network requiring high quality and reliability of management and monitoring of a communication state.

In the conventional communication network based on SONET (Synchronous Optical NETwork)/SDH (Synchronous Digital Hierarchy), a carrier-class meticulous monitoring/control function (Operations, Administration and Maintenance: OAM function) of the SONET/SDH has met carrier-grade service requirements.

Even while the communication network based on the SONET/SDH shifts to a packet network, the OAM function which has the same quality as the quality of the communication network based on the SONET/SDH must be achieved. To achieve the OAM function, active discussions have recently been held on standardization.

For example, the OAM mechanism for the Ethernet is recommended as Y. 1731 in ITU-t.

As regards, MPLS-TP (Multi Protocol Label Switching-Transport Profile) attracting attention as a packet transport technology based on MPLS (Multi-Protocol Label Switching), in IETF (Internet Engineering Task Force), standardization of the OAM function has made progress as one of the functions that shows promise.

The OAM functions are classified into a Fault Management (FM) function for detecting, notifying, or localizing an obstacle and a Performance Monitor (PM) function for monitoring the performance of data traffic.

One of such PM functions is the diagnostic function (Diagnostic Test function (hereinafter, referred to as TST function) of a monitoring section.

FIG. 1 shows the configuration example of a communication network and a monitoring section where a commonly defined TST function is executed.

As shown in FIG. 1, in the communication network where communication devices 100 to 400 are connected in series, a monitoring section is set between MEP (Maintenance End Point) #100 of communication device 100 and MEP #400 of communication device 400 which are end points, and MIP (Maintenance Intermediate Point) #200 of communication device 200 and MIP #300 of communication device 300 are set midway therebetween. In the case of a 1-way TST function for executing monitoring of a communication state in one way, by transmitting/receiving a TST frame in one direction from MEP #100 to MEP #400 or from MEP #400 to MEP #100, continuity (throughput) or a frame loss is checked at a TST transmission rate in this section.

CITATION LIST

Nonpatent Literature

Nonpatent Literature 1: ITU-T, Y. 1731
Nonpatent Literature 2: IETF PFC5860, Requirements for Operations, Administration, and Maintenance (OAM) in MPLS Transport Networks
Nonpatent Literature 3: IETF draft-ietf-mpls-tp-oam-framework, Operations, Administration and Maintenance Framework for MPLS-based Transport Networks

SUMMARY OF INVENTION

Problems to be Solved by Invention

In the configuration example shown in FIG. 1, if the TST function can be executed between the MEP and the MIP (from MEP #100 to MIP #200, from MEP #100 to MIP #300, from MEP #400 to MIP #300, and from MEP #400 to MIP #200), diagnosis can be performed between sections more finely subdivided than between the MEPs, thus enabling more meticulous monitoring control.

However, in compliance with the aforementioned common standard, the TST function cannot be executed between the MEP and the MIP while it can be executed between the MEP and the MEP. This creates a problem, i.e., more meticulous monitoring control cannot be performed.

When the points of the MIP operate as MEPs, it creates a problem, i.e., a mounting size of functions thereof is larger.

It is therefore an object of the present invention to achieve more meticulous monitoring control by enabling execution of a TST function between MEP and MIP in compliance with the common standard.

Solution to Problem

According to the present invention, there is provided a diagnostic system for diagnosing a network in which a transmission source node and a transmission destination node are connected via a relay node. The transmission source node includes a diagnostic frame processing unit that generates diagnostic frames in which the number of hops that is counted until the relay node is set as a TTL value and the TTL value is stored in a predetermined field, and transmits the diagnostic frames to the relay node. The relay node includes:

a TTL processing unit that decrements, when the diagnostic frames are received, the TTL value stored in the field of the diagnostic frames; and a diagnostic frame processing unit that counts the number of diagnostic frames in which the TTL value decremented by the TTL processing unit is 0, discards the diagnostic frames, and outputs the counted number of diagnostic frames as the number of checked frames; and checks continuity in a direction from the transmission source node to the relay node between the transmission source node and the relay node based on the number of transmitted diagnostic frames transmitted from the transmission source node and the number of checked frames.

According to the present invention, there is provided a diagnostic system for diagnosing a network in which a transmission source node and a transmission destination node are connected via a relay node. The transmission source node includes a diagnostic frame processing unit that generates diagnostic frames in which the number of hops that is counted until the relay node is set as a TTL value and the TTL value is stored in a predetermined field, and transmits the diagnostic frames to the relay nod. The relay node includes:

an input line card that decrements, on an input interface side of the relay node, when the diagnostic frames are received, the TTL value stored in the field of the diagnostic frames, count the number of diagnostic frames in which the decremented TTL value is 0, transfers the diagnostic frames, and outputs the counted number of diagnostic frames as the number of checked frames; and an output line card that counts, on an output interface side of the relay node, among the diagnostic frames transferred from the input line card, the number of diagnostic frames in which the decremented TTL value is 0, and outputs the counted number of diagnostic frames as the number of checked frames; and checks continuity in a direction from the transmission source node to the relay node between the transmission source node and the input line card and between the transmission source node and the output line card based on the number of transmitted diagnostic frames transmitted from the transmission source node, the number of checked frames output from the input line card, and the number of checked frames output from the output line card.

According to the present invention, there is provided a transmission source node connected to a transmission destination node via a relay node, including:

a diagnostic frame processing unit that generates diagnostic frames in which the number of hops that is counted until the relay node is set as a TTL value and the TTL value is stored in a predetermined field, and transmits the diagnostic frames to the relay node According to the present invention, there is provided a relay node for relaying data between a transmission source node and a transmission destination node, including:

a TTL processing unit that decrements, when diagnostic frames transmitted from the transmission source node are received, a TTL value stored in a predetermined field of the diagnostic frames; and a diagnostic frame processing unit that counts the number of diagnostic frames in which the TTL value decremented by the TTL processing unit is 0, discards the diagnostic frames, and output the counted number of diagnostic frames.

According to the present invention, there is provided a relay node for relaying data between a transmission source node and a transmission destination node, including:

an input line card that decrements, on an input interface side of the relay node, when diagnostic frames transmitted from the transmission source node are received, a TTL value stored in a predetermined field of the diagnostic frames, counts the number of diagnostic frames in which the decremented TTL value is 0, transfers the diagnostic frames, and outputs the counted number of diagnostic frames; and an output line card that counts, on an output interface side of the relay node, among the diagnostic frames transferred from the input line card, the number of diagnostic frames in which the decremented TTL value is 0, and outputs the counted number of diagnostic frames.

According to the present invention, there is provided an input line card mounted on a relay node for relaying data between a transmission source node and a transmission destination node, and configured to decrement, on an input interface side of the relay node, when diagnostic frames transmitted from the transmission source node are received, a TTL value stored in a predetermined field of the diagnostic frames, count the number of diagnostic frames in which the decremented TTL value is 0, transfer the diagnostic frames, and output the counted number of diagnostic frames.

According to the present invention, there is provided an output line card mounted on a relay node for relaying data between a transmission source node and a transmission destination node, and configured to count, on an output interface side of the relay node, among diagnostic frames transferred from an input line card mounted on an input interface side of the relay node, the number of diagnostic frames in which a TTL value stored in a predetermined field is 0, and output the counted number of diagnostic frames.

According to the present invention, there is provided a diagnostic method for diagnosing a network in which a transmission source node and a transmission destination node are connected via a relay node, the method comprising:

the transmission source node generating diagnostic frames in which the number of hops that is counted until the relay node is set as a TTL value and the TTL value is stored in a predetermined field;

the transmission source node transmitting the diagnostic frames to the relay node;

the relay node decrementing, when the diagnostic frames are received, the TTL value stored in the field of the diagnostic frames;

the relay node counting the number of diagnostic frames in which the decremented TTL value is 0;

the relay node discarding the diagnostic frames in which the decremented TTL value is 0;

the relay node outputting the counted number of diagnostic frames as the number of checked frames; and checking continuity in a direction from the transmission source node to the relay node between the transmission source node and the relay node based on the number of transmitted diagnostic frames transmitted from the transmission source node and the number of checked frames.

According to the present invention, there is provided a diagnostic method for diagnosing a network in which a transmission source node and a transmission destination node are connected via a relay node, the method comprising:

the transmission source node generating diagnostic frames in which the number of hops that is counted until the relay node is set as a TTL value and the TTL value is stored in a predetermined field;

the transmission source node transmitting the diagnostic frames to the relay node;

the relay node decrementing, on an input interface side, when the diagnostic frames are received, the TTL value stored in the field of the diagnostic frames;

the relay node counting the number of diagnostic frames in which the decremented TTL value is 0;

the relay node transferring the diagnostic frames in which the decremented TTL value is 0;

the relay node outputting the counted number of diagnostic frames as the number of checked frames;

the relay node counting, on an output interface side of the relay node, among the diagnostic frames transferred from the input interface side, the number of diagnostic frames in which the TTL value is 0;

the relay node outputting the number of diagnostic frames counted on the output interface side as the number of checked frames; and checking continuity in a direction from the transmission source node to the relay node between the transmission source node and the input interface side and between the transmission source node and the output interface side based on the number of transmitted diagnostic frames transmitted from the transmission source node, the number of checked frames output from the input interface side, and the number of checked frames output from the output interface side.

According to the present invention, there is provided a program for causing a transmission source node connected to a transmission destination node via a relay node to execute:

a step of generating diagnostic frames in which the number of hops that is counted until the relay node is set as a TTL value and the TTL value is stored in a predetermined field; and a step of transmitting the diagnostic frames to the relay node According to the present invention, there is provided a program for causing a relay node for relaying data between a transmission source node and a transmission destination node to execute:

a step of decrementing, when diagnostic frames transmitted from the transmission source node are received, a TTL value stored in a predetermined field of the diagnostic frames; and a step of counting the number of diagnostic frames in which the decremented TTL value is 0;

a step of discarding the diagnostic frames; and a step of outputting the counted number of diagnostic frames.

According to the present invention, there is provided a program for causing a relay node for relaying data between a transmission source node and a transmission destination node to execute:

a step of decrementing, on an input interface side of the relay node, when diagnostic frames transmitted from the transmission source node are received, a TTL value stored in a predetermined field of the diagnostic frames;

a step of counting the number of diagnostic frames in which the decremented TTL value is 0;

a step of transferring the diagnostic frames in which the decremented TTL value is 0;

a step of outputting the counted number of diagnostic frames;

a step of counting, on an output interface side of the relay node, among the transferred diagnostic frames, the number of diagnostic frames in which the TTL value is 0; and a step of outputting the number of diagnostic frames counted on the output interface side.

According to the present invention, there is provided a program for causing an input line card mounted on a relay node for relaying data between a transmission source node and a transmission destination node to execute:

a step of decrementing, on an input interface side of the relay node, when diagnostic frames transmitted from the transmission source node are received, a TTL value stored in a predetermined field of the diagnostic frames;

a step of counting the number of diagnostic frames in which the decremented TTL value is 0;

a step of transferring the diagnostic frames in which the decremented TTL value is 0; and a step of outputting the counted number of diagnostic frames.

According to the present invention, there is provided a program for causing an output line card mounted on a relay node for relaying data between a transmission source node and a transmission destination node to execute:

a step of counting, on an output interface side of the relay node, among diagnostic frames transferred from an input line card mounted on an input interface side of the relay node, the number of diagnostic frames in which a TTL value stored in a predetermined field is 0; and a step of outputting the counted number of diagnostic frames.

Effects of Invention

As described above, according to the present invention, more meticulous monitoring control can be achieved by enabling execution of the TST function between the MEP and the MIP in compliance with the common standard.

DESCRIPTION OF EMBODIMENTS

Hereinafter, the embodiments of the present invention will be described in detail with reference to the drawings.

First Embodiment

Description of Configuration

Figure 1:
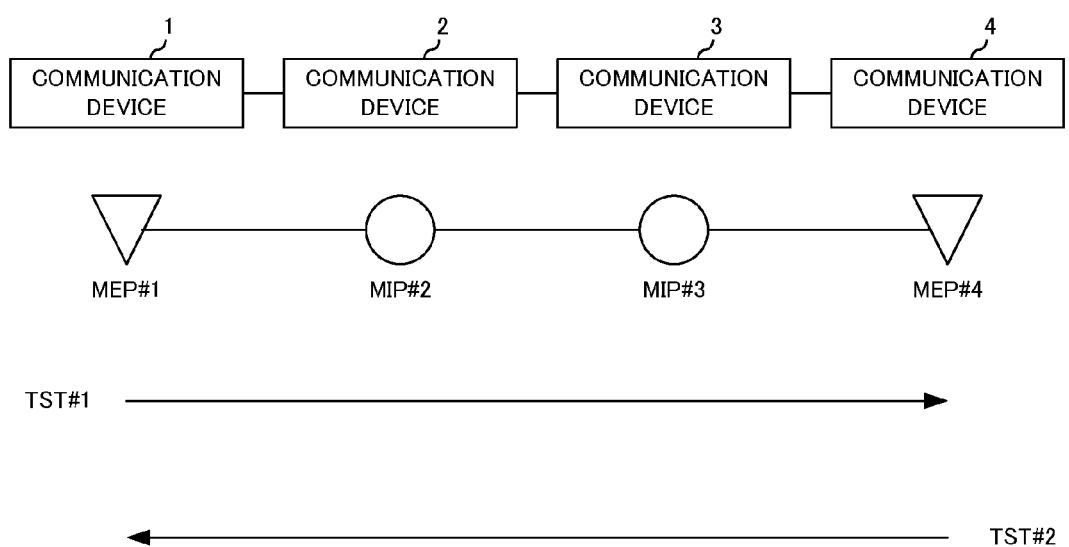
FIG. 1 A diagram showing the configuration example of a communication network and a monitoring section where a commonly defined TST function is executed.
Figure 2:
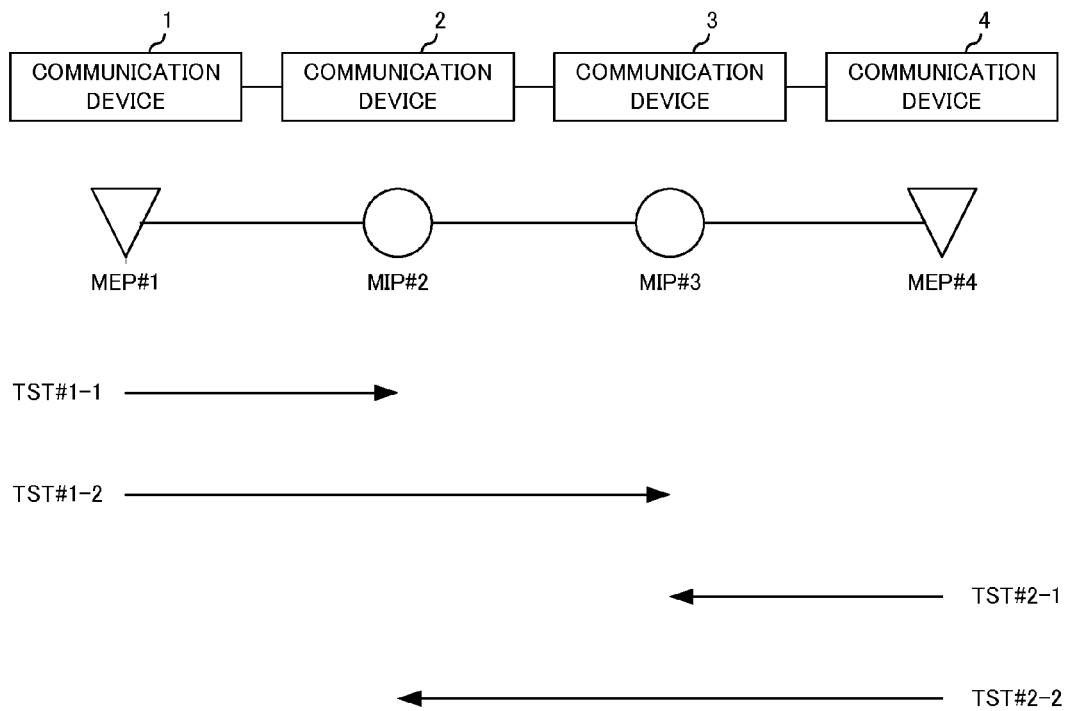
FIG. 2 A diagram showing an example of a diagnostic system and a monitoring section where a TST function is executed according to a first embodiment.

FIG. 2 is a diagram showing an example of a diagnostic system and a monitoring section where a TST (diagnostic) function is executed according to a first embodiment.

In this embodiment, as shown in FIG. 2, communication devices 1 to 4 are connected in series. As monitoring points, MEP #1, MEP #2, MEP #3, and MEP #4 are respectively set in communication devices 1 to 4. In the embodiment, communication devices 1 and 4 are transmission nodes. In the embodiment, communication devices 2 and 3 are relay nodes. In other words, only communication devices 1 and 4 have functions of counting transmitted or received TST frames which are diagnostic frames, while communication devices 2 and 3 have no such functions.

TST functions (TST #1-1, #1-2, #2-1, and #2-2) from the MEP to the MIP, which is the aforementioned object, are realized.

Figure 3:
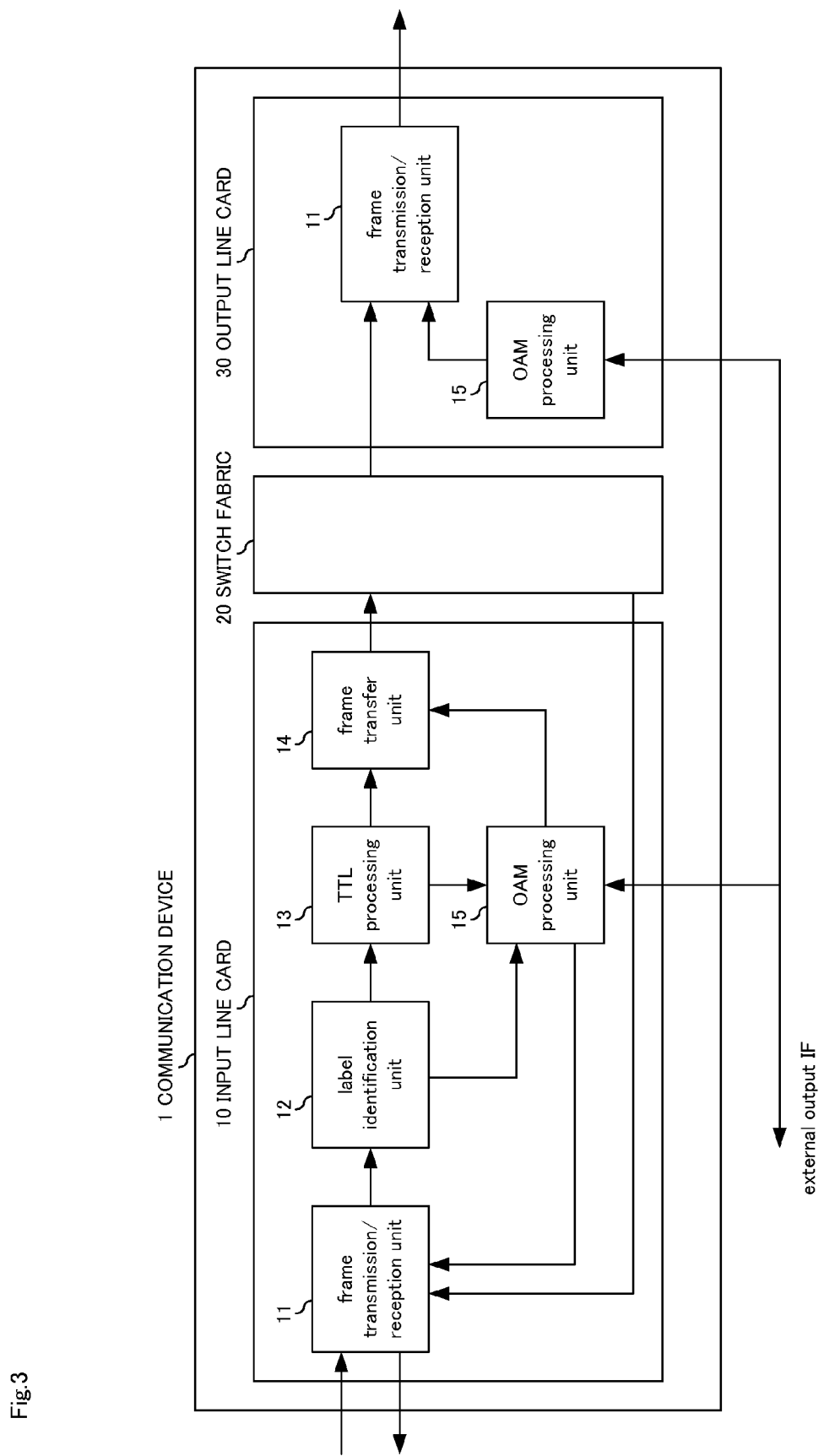
FIG. 3 A diagram showing an example of the internal configuration of a communication device shown in FIG. 2.

FIG. 3 is a diagram showing an example of the internal configuration of communication device 1 shown in FIG. 2. The internal configurations of communication devices 2 to 4 shown in FIG. 2 are similar to that shown in FIG. 3.

Communication device 1 shown in FIG. 2 includes, as shown in FIG. 3, input line card 10, switch fabric 20, and output line card 30. These are respectively cards (boards or substrates), and can be chassis types such as units or cases on which the cards are mounted. These can also be single board types which include an input port corresponding to input line card 10, an output port corresponding to output line card 30, and the switch fabric connected by them in one card.

Input line card 10 includes, as shown in FIG. 3, on the input interface side of communication device 1, frame transmission/reception unit 11, label identification unit 12, TTL processing unit 13, frame transfer unit 14, and OAM processing unit 15.

The output card includes, as shown in FIG. 3, on the output interface side of communication device 1, frame transmission/reception unit 11 and OAM processing unit 15.

Frame transmission/reception unit 11 transfers a fame received from the outside to label identification unit 12. Frame transmission/reception unit 11 outputs a frame received from OAM processing unit 15 or switch fabric 20 to the outside.

Label identification unit 12 identifies the LSP (Label Switched Path) label of the frame received from the frame transmission/reception unit 11. When the result of the identification shows a LSP label indicating that the frame should be relay-transferred, label identification unit 12 transfers the frame to TTL processing unit 13.

When the result of the identification shows a LSP label indicating that the frame should be terminated, label identification unit 12 refers to a predetermined identification header ("GAL label" described below) in the frame to determine whether the frame is an OAM frame.

When the frame is an OAM frame, label identification unit 12 transfers the frame to OAM processing unit 15. When the frame is not an OAM frame, label identification unit 12 discards or performs other termination processing for the frame. The other termination processing in label identification unit 12 has no direct relation to the present invention, and thus description thereof will be omitted.

TTL processing unit 13 reads a TTL (Time To Live) value included in the LSP label in the frame received from label identification unit 12, calculates "TTL=TTL−1" to update the TTL value, and then determines whether the updated TTL value is "0".

When the updated TTL value is not "0", TTL processing unit 13 transfers the frame to frame transfer unit 14. When the updated TTL value is "0", TTL processing unit 13 refers to the identification header of the frame to determine whether the frame is an OAM frame.

When the frame is an OAM frame, TTL processing unit 13 transfers the frame to OAM processing unit 15. When the frame is not an OAM frame, TTL processing unit 13 discards or performs other termination processing for the frame. The discarding or the other termination processing has no direct relation to the present invention, and thus description thereof will be omitted.

When the updated TTL value is "0" and the frame is a TST frame of an OAM frame, TTL processing unit 13 counts the number of frames.

Frame transfer unit 14 swaps the label of the frame received from TTL processing unit 13 or OAM processing unit 15, and designates a transfer destination port to transfer the frame to switch fabric 20.

OAM processing unit 15 is a diagnostic frame processing unit which receives the OAM frame from label identification unit 12 or TTL processing unit 13 to perform processing according to the OAM frame type. OAM processing unit 15, which has received an OAM frame generation instruction from an external output IF, generates an OAM frame. The processed or generated OAM frame is transferred to frame transmission/reception unit 11 or frame transfer unit 14. After the processing performed according to the OAM frame type, OAM processing unit 15 stores or outputs the result or the progress of the OAM processing to a host device or the like via the external output IF (InterFace) when necessary. When installed in a transmission destination node (e.g., communication device 1), OAM processing unit 15 counts the number of received TST frames as the number of received frames, and outputs the number of received frames to the host device.

Switch fabric 20 transfers the frame received from frame transfer unit 14 to the designated transfer destination port.

Figure 4:
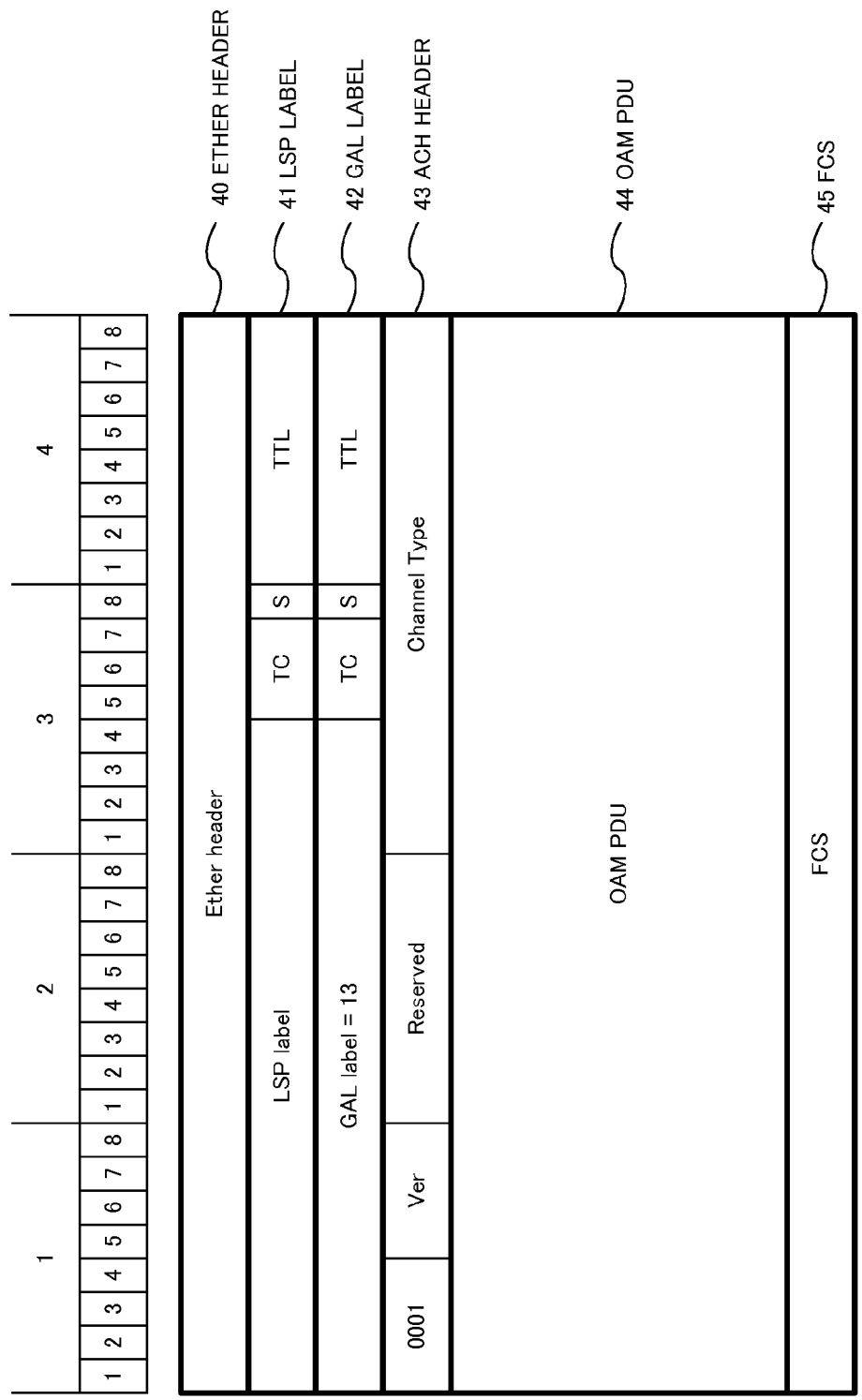
FIG. 4 A diagram showing an example of the frame format of an OAM frame in MPLS-TP.

FIG. 4 is a diagram showing an example of the frame format of an OAM frame in MPLS-TP.

In the MPLS-TP, there is a partial difference in the format of the OAM frame between layers. FIG. 4 shows the format of a LSP layer as a representative example. As shown in FIG. 4, the OAM frame includes the following fields:

EtherHeader 40 including ether destination/transmission source address or the like LSP label 41 storing transfer information of LSP layer GAL label 42 indicating OAM frame by storing specific value "13" in GAL label ACH header 43 indicating OAM channel (control channel)

OAM PDU (Protocol Data Unit) 44 storing information for each OAM type

FCS 45 storing Frame Check Sequence information

The type of the OAM frame is identified based on the Channel Type value of ACH header 43, or the Channel Type value and a predetermined value in OAM PDU 44. In other words, a value indicating a TST frame is stored in the Channel Type or in a predetermined field in Channel Type+OAM PDU.

The TTL value processed by TTL processing unit 13 of communication devices 1 to 4 is stored in a TTL field in LSP label 41.

Information indicating a traffic class is stored in a TC field. Information as to whether the label is the bottom of a label stack is stored in a S field. For example, when GAL label 42 is the bottom of a label stack of the frame, "0" is stored in the S field of LSP label 41, and "1" is stored in the S field of GAL label 42.

<Description of Operation>

Hereinafter, a diagnostic method according to the embodiment will be described. The transmission processing and the relay processing of TST #1-2 (TST execution from MEP #1 of communication device 1 through MIP #2 of communication device 2 to MEP #3 of communication device 3) shown in FIG. 2 will be described by way of examples. The processing described below can be achieved by executing a program stored in memory or the like (not shown) by a CPU (Central Processing Unit) in communication devices 1 to 4, or used when a programmable logic device is designed to be achieved by a hardware operation.

(a) TST frame transmission operation (MEP #1 of communication device 1)

Figure 5:
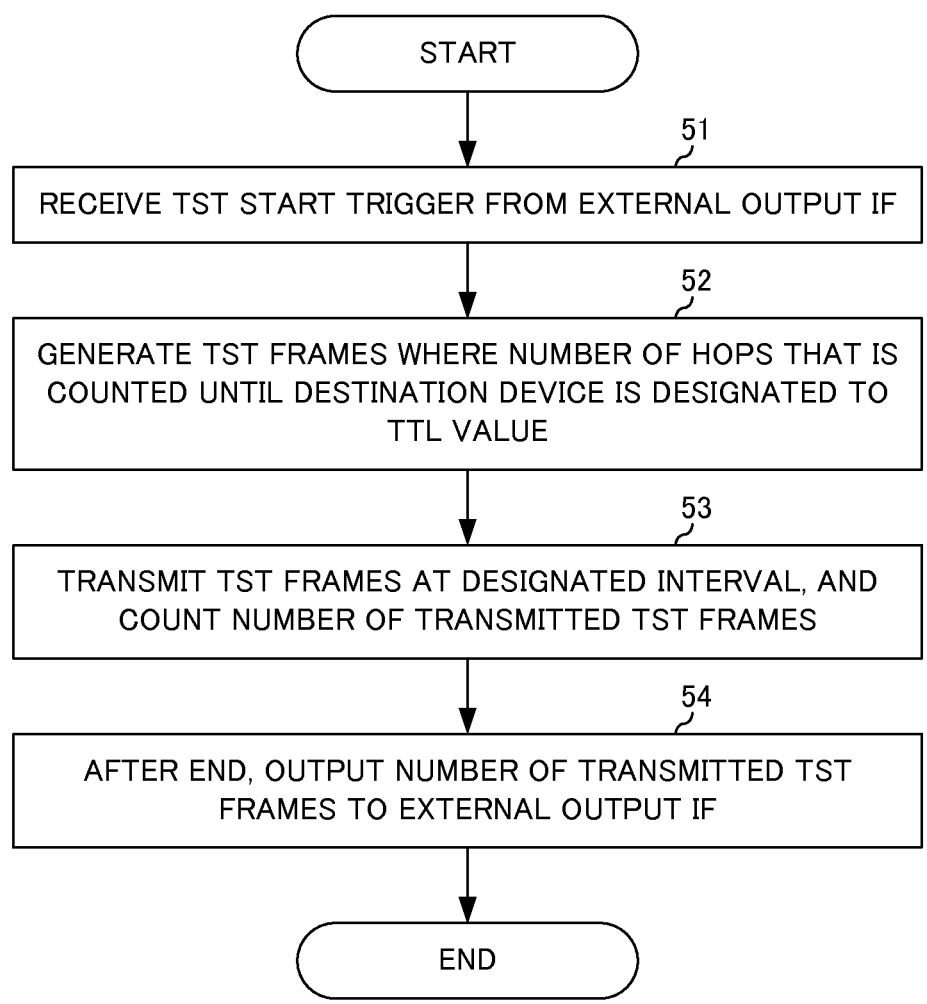
FIG. 5 A flowchart illustrating an example of transmission processing in the communication device which is a transmission node of a TST frame in a diagnostic method according to the first embodiment.

FIG. 5 is a flowchart illustrating an example of transmission processing in communication device 1 (transmission source node) which is a transmission node of a TST frame in the diagnostic method according to the embodiment. This processing is performed in OAM processing unit 15 in output line card 30 of communication device 1.

First, in step 51, OAM processing unit 15 receives a TST start instruction which is a TST start trigger from the external output IF. In step 52, OAM processing unit 15 generates a TST frame. In the TST frame, in compliance with the aforementioned standard, a LSP label to be transmitted to MEP #4 of communication device 4 (transmission destination node) which is an opposite end point is set. To execute TST from MEP #1 to MEP #3, in the TST frames, "2" that is the number of hops from MEP #1 to MEP #3 is set as a TTL value, and "2" is stored in the TTL field of LSP label 41 shown in FIG. 4.

The number of hops is set as the TTL value because the TST frame is TTL-expired in destination MIP #3 (discarded with TTL=0).

Then, in step 53, OAM processing unit 15 transfers TST frames to frame transfer unit 14 at a designated interval (rate), and counts the number of transferred frames (number of transmitted frames).

In step 54, OAM processing unit 15 ends the TST frame transmission when a TST end trigger occurs, such as when the TST frame is transmitted at the desgnated transmission times (e.g., designated at TST start time), when the end time passes, or when a TST end instruction from the external output IF is received. Then, OAM processing unit 15 outputs the number of transmitted frames to an external device such as an operating system, CLI (Command Line Interfaces), or a memory which is an external output IF.

(b) TST Frame Relay Operation (MIP #2 of Communication Device 2)

In communication device 2 (MIP #2) that is a relay node, frame transmission/reception unit 11 transfers the TST frames to label identification unit 12 after it has received the TST frames transmitted from communication device 1.

Figure 6:
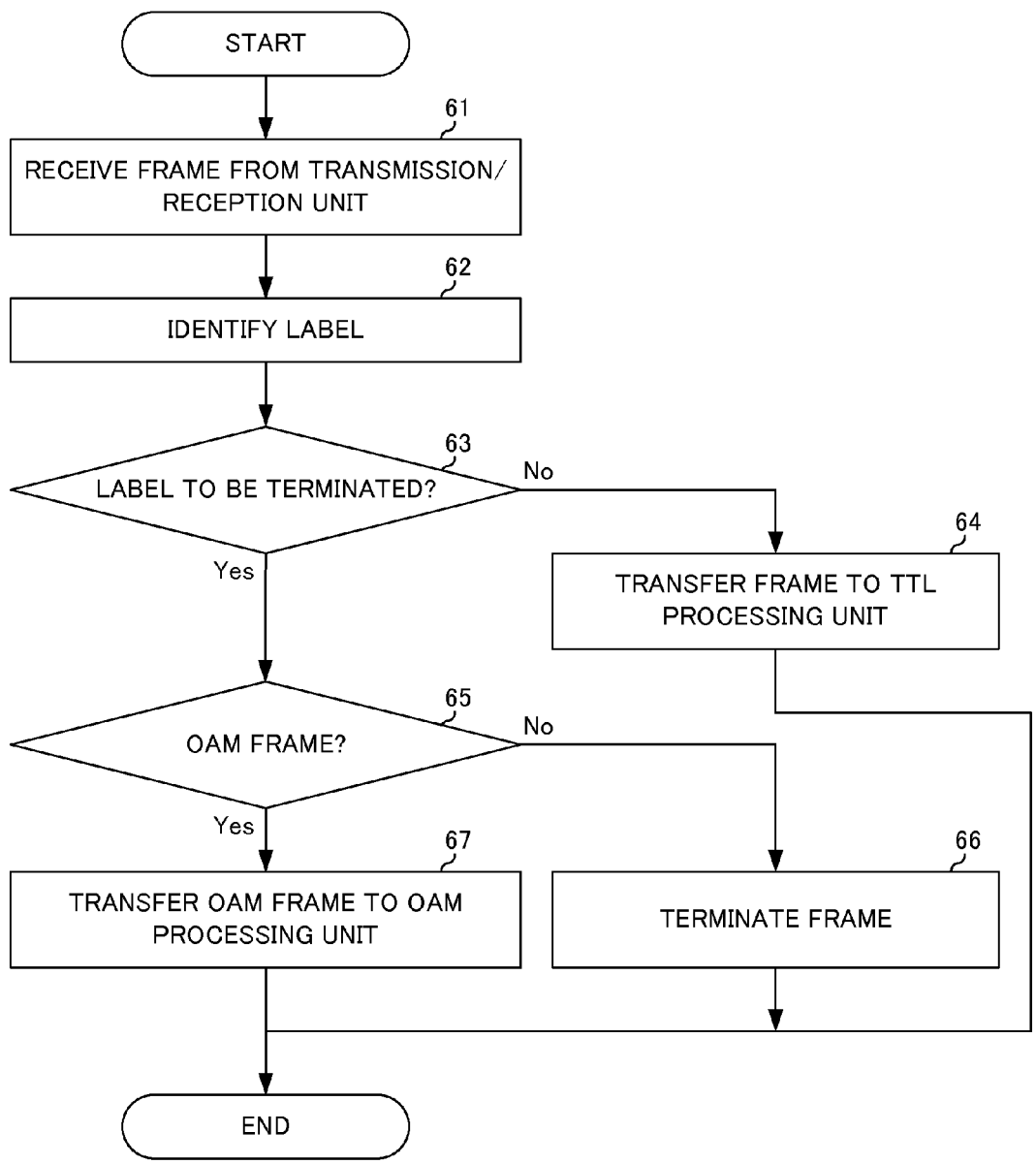
FIG. 6 A flowchart illustrating an example of relay processing in the communication device which is a relay node of the TST frame in the diagnostic method according to the first embodiment.

FIG. 6 is a flowchart illustrating an example of relay processing in communication device 2 which is a relay node of the TST frame in the diagnostic method according to the embodiment. This processing is performed by label identification unit 12 in input line card 10 of communication device 2.

In step 61, label identification unit 12 receives a frame from frame transmission/reception unit 11. In step 62, label identification unit 12 identifies a LSP label which is a transfer label of the received frame. Then, in step 63, label identification unit 12 identifies which the label value stored in the field of the LSP label shown in FIG. 4 is label value to use for relaying the frame or which label value to use for terminating the frame.

In the conditional branching of step 63, when the label value is a label value to terminate the frame, in step 65, label identification unit 12 determines whether the frame is an OAM frame. When there is "13" stored in the GAL label shown in FIG. 4, label identification unit 12 determines that the frame is an OAM frame.

On the other hand, in the conditional branching of step 63, when the label value is a value that is not used to terminate the frame but is used to relay the frame, in step 64, label identification unit 12 transfers the frame to TTL processing unit 13. In the embodiment, the destination of the TST frame received in communication device 2 is communication device 4. Thus, the label value is a value that is used to relay the frame and, in step S64, label identification unit 12 transfers the frame to TTL processing unit 13.

In the conditional branching of step 65, when it is determined that the frame is not an OAM frame, in step 66, the frame is terminated, and normal data frame processing is performed. Specifically, when an outermost label is removed, and there is still a label, label transfer is executed. When the outermost label is removed, and there is no more label, client frame transfer is executed.

In the conditional branching of step 65, when it is determined that the frame is an OAM frame, label identification unit 12 transfers the label to OAM processing unit 15. Then, OAM processing unit 15 performs OAM processing. The OAM processing varies from one OAM frame type to another. For example, when the frame is a TST frame, the number of received frames is counted up, and the frames are discarded.

Figure 7:
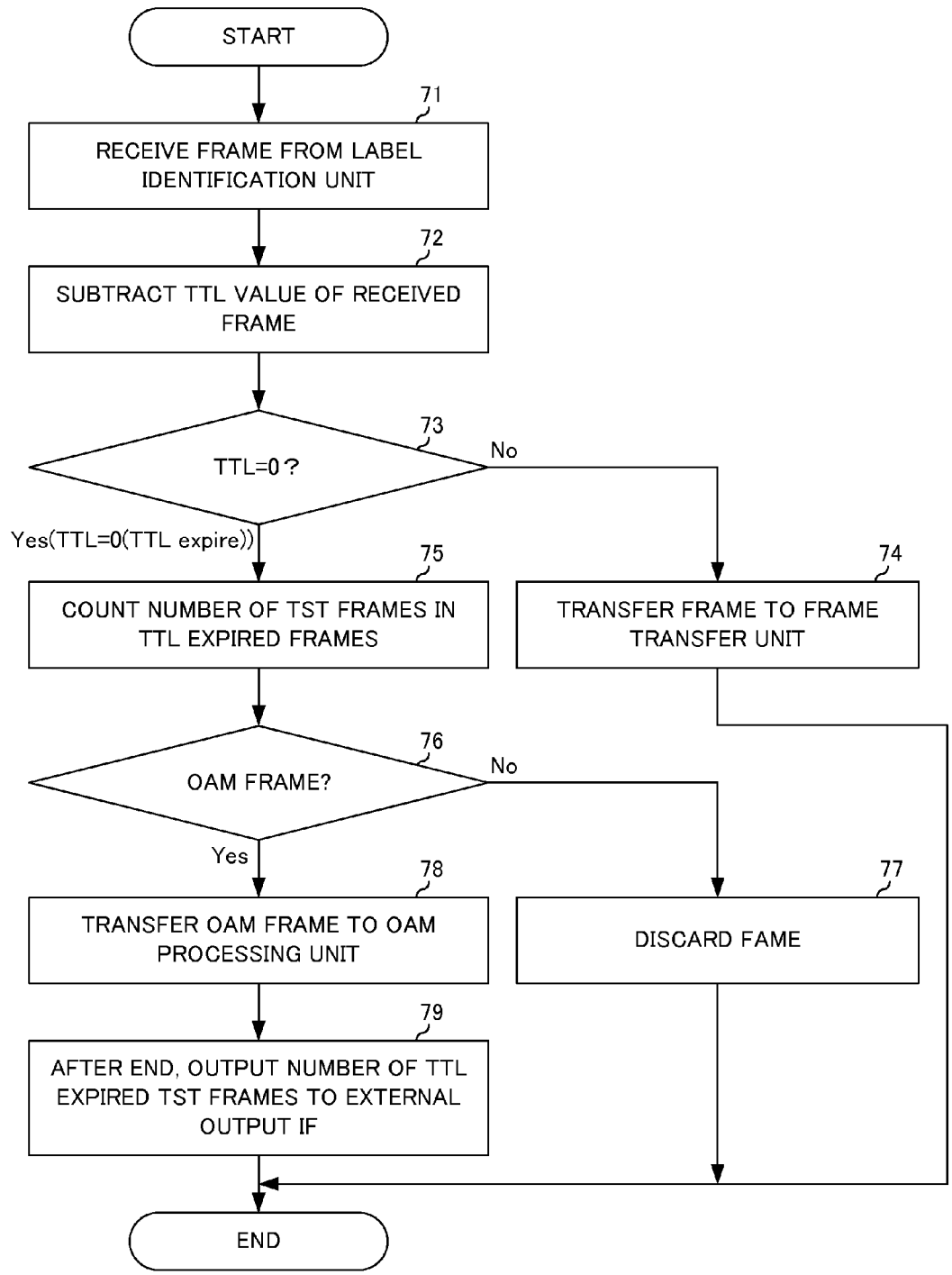
FIG. 7 A flowchart illustrating an example of relay processing in the communication device which is the relay node of the TST frame in the diagnostic method according to the first embodiment.

FIG. 7 is a flowchart illustrating an example of relay processing in communication device 2 which is a relay node of the TST frame in the diagnostic method according to the embodiment. This processing is performed by TTL processing unit 13 in input line card 10 of communication device 2.

In step 71, TTL processing unit 13 receives a frame from label identification unit 12. In step 72, TTL processing unit 13 subtracts "1" from the TTL value stored in the TTL field of LSP label 41 of the received frame. Specifically, TTL processing unit 13 decrements the TTL value stored in the TTL field of LSP label 41 of the received frame. In this case, the TTL value of the received frame is "2", and thus a new TTL value is "1".

In step 73, TTL processing unit 13 determines whether the TTL value is "0".

In the conditional branching of step 73, when the TTL value is not "0", in step 74, TTL processing unit 13 transfers the frame to frame transfer unit 14.

In step 74, the label of the TST frame transferred to frame transfer unit 14 is swapped, passed through switch fabric 20, and transferred from frame transmission/reception unit 11 of output line card 30 of an appropriate output destination to the outside.

On the other hand, in the conditional branching of step 73, processing when the TTL value is "0", in other words, when the frame is TTL expired with the TTL value "0", will be described below. The TTL value of the TST frame is updated to "1", and the processing of step 74 is executed.

(c) TST Frame Reception Operation (MIP #3 of Communication Device 3)

Processing in communication device 3 will be described referring to the flowcharts shown in FIGS. 6 and 7.

In communication device 3 (MIP #3), after it has received the TST frame from communication device 2, frame transmission/reception unit 11 transfers the received TST frame to label identification unit 12.

In step 61, label identification unit 12 receives a frame from frame transmission/reception unit 11. In step 62, label identification unit 12 identifies a LSP label which is a transfer label of the received frame. Then, in step 63, label identification unit 12 identifies which the label value stored in the field of the LSP label shown in FIG. 4 is label value to use for relaying the frame or which label value to use for terminating the frame.

In the conditional branching of step 63, when the label value is a value that is not used to terminate the frame but is used to relay the frame, in step 64, label identification unit 12 transfers the frame to TTL processing unit 13. In the embodiment, the destination of the TST frame received in communication device 3 is communication device 4. Thus, the label value is a value that is used to relay the frame and, in step S64, label identification unit 12 transfers the frame to TTL processing unit 13.

Then, in step 71, TTL processing unit 13 receives a frame from label identification unit 12. In step 72, TTL processing unit 13 subtracts "1" from the TTL value stored in the TTL field of LSP label 41 of the received frame. In this case, the TTL value of the received frame is "1", and thus a new TTL value is "0".

In step 73, TTL processing unit 13 determines whether the TTL value is "0".

In the conditional branching of step 73, the TTL value is "0", and the frame is TTL expired with the TTL value "0". Thus, the processing of step 75 is executed.

In step 75, TTL processing unit 13 counts, from among the frames whose TTL value has expired, the number of TST frames from presence of GAL labels, ACH headers, and information of OAM PDU. When an operation is performed in which OAM frames, whose TTL value expires, are only TST frames (e.g., when LB function where TTL expire is defined as a standard operation is unsupported, or when LB function and TST function are not simultaneously activated), without determining TST frames from Channel Type values of ACH headers or contents of OAM PDU, the TST frames whose the TTL value has expired can be counted only based on the presence of the GAL labels.

Then, in step 76, TTL processing unit 13 determines whether or not the frame whose TTL value has expired is an OAM frame. For this determination, as described above, TTL processing unit 13 refers to the GAL label.

In the conditional branching of step 76, when the frame whose TTL value has expired is an OAM frame, in step 78, TTL processing unit 13 transfers the OAM frame to OAM processing unit 15.

On the other hand, in the conditional branching of step 76, when the frame whose TTL value has expired is not an OAM frame, in step 77, TTL processing unit 13 discards the OAM frame. There is no need to transfer the TST frame whose TTL value has expired because no processing is necessary in OAM processing unit 15.

In step 79, TTL processing unit 13 ends the counting of TST frames whose TTL value has expired when a TST end trigger occurs, such as when the designated end time passes (e.g., designated at TST start time) or when a TST end instruction from the external output IF is received. Then, TTL processing unit 13 outputs the counted number of TST frames as the number of checked frames to an external device such as an operating system, CLI, or a memory which is an external output IF.

Thus, according to the embodiment, TST can be executed from the MEP to the MIP by setting the TTL value to the number of hops that is counted until the destination MIP in the TST frame compliant with the standard as the transmission operation and counting the number of TST frames whose TTL value has expired in the MIP as the reception operation. As described above, the TST frame to be transmitted is compliant with the standard. The processing in the MIP is the counting processing of frames whose TTL value has expired as a normal node operation, and can be achieved under conditions compliant with the standard.

Hereinafter, a specific example of the diagnostic function of a monitoring section using the TST function of the present invention will be described.

(1) Continuity Checking Between MEP and MIP

In a standard TST function, continuity at a TST frame transmission rate between the MEP and the MIP is checked.

By using the present invention, continuity at the TST frame transmission rate between the MEP and the MIP can be checked.

As shown in FIG. 2, continuity in one way between the MEP and the MIP can be checked as in the case of TST #1-1 (MEP #1→MIP #2), TST #1-2 (MEP #1→MIP #3), TST #2-1 (MEP #4→MIP #3), and TST #2-2 (MEP #4→MIP #2).

Operations can be performed respectively as follows:

TST #1-1 (MEP #1→MIP #2): 1-way of MEP #1 → MEP #4 TTL = 1 at TST
TST #1-2 (MEP #1→MIP #3): 1-way of MEP #1 → MEP #4 TTL = 2 at TST
TST #2-1 (MEP #4→MIP #3): 1-way of MEP #4 → MEP #1 TTL = 1 at TST
TST #2-2 (MEP #4→MIP #2): 1-way of MEP #4 → MEP #1 TTL = 2 at TST (2) Failure Place Specifying in One Way As an OAM tool for specifying a place where a failure (obstacle) occurs, a Loopback (LB) function is prepared. The failure place can be specified by using the LB function. However, in the case of a one-way failure, its direction cannot be specified. On the other hand, by using the TST function of the present invention, the failure place and the direction can both be specified.

First, failure place specifying when a one-way obstacle (obstacle in direction from communication device 2 to communication device 3 between communication devices 2 and 3) is generated will be described.

Figure 8:
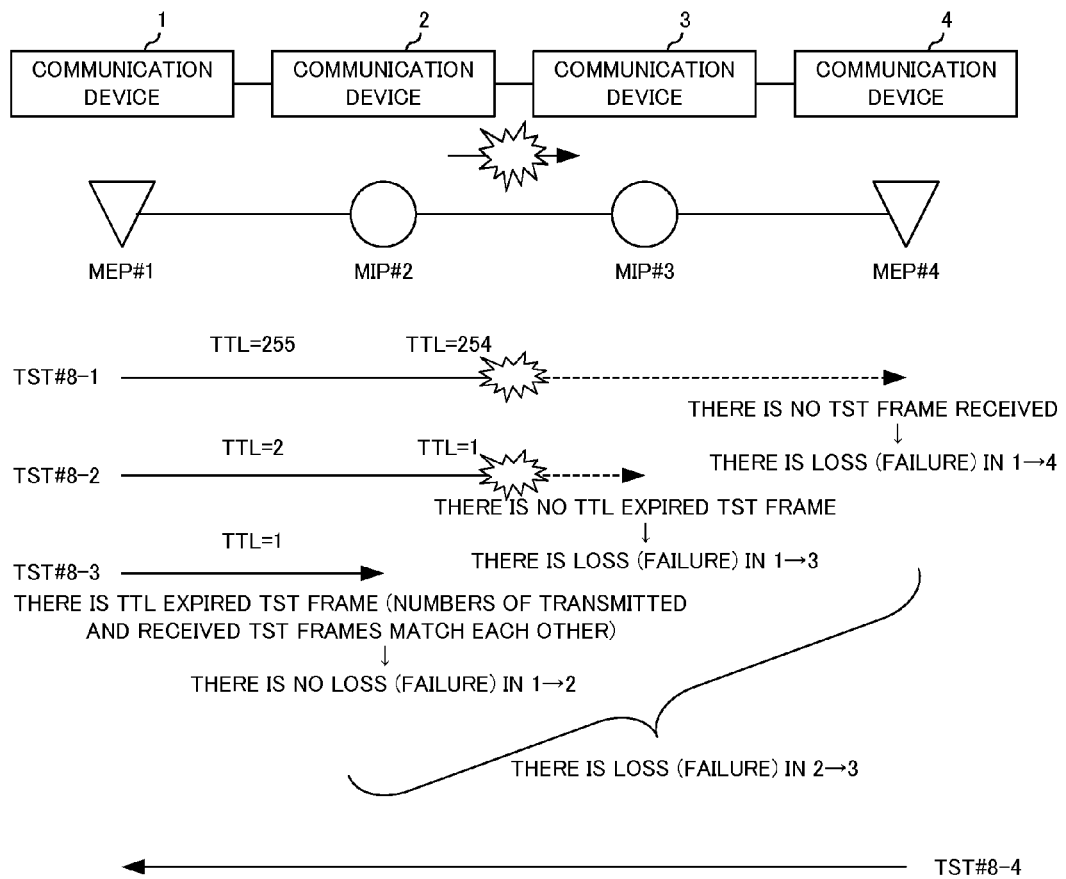
FIG. 8 A diagram showing a failure place specifying state when a one-way obstacle is generated between communication devices 2 and 3 in a network shown in FIG. 2.

FIG. 8 is a diagram showing a failure place specifying state when a one-way obstacle is generated between communication devices 2 and 3 in a network shown in FIG. 2.

When a failure is detected in a service to perform failure place specifying, a general procedure is checking End-to-point and narrowing down sections to specify failure places.

In an example shown in FIG. 8, as TST #8-1, TST is executed from MEP #1 to MEP #4. A label when communication device #4 is a destination is set as a destination label, "255" that is a maximum value is set as a TTL value, and then the TST frame is transmitted. This TST frame is not received by communication device #4 because it is discarded between communication devices #2 and #3. As a result, a failure can be identified between communication devices 1 and 4.

Then, as the specifying section narrowed-down TST, TST #8-2 is executed from MEP #1 to MIP #3. A label when communication device #4 is a destination is set as a destination label, "2" that is the number of hops that is counted until MIP #3 is set as a TTL value, and then the TST frame is transmitted. This TST frame is not received by communication device #3 because it is discarded between communication devices #2 and #3. In other words, in communication device #3 where MIP #3 is present, there is no TTL expired TST frame. As a result, a failure can be identified between communication devices 1 and 3.

Then, as the narrowed-down specifying section TST, TST #8-3 is executed from MEP #1 to MIP #2. A label when communication device #4 is a destination is set as a destination label, "1" that is the number of hops that is counted until MIP #2 is set as a TTL value, and then the TST frame is transmitted. This TST frame is TTL expired with TTL=0 set in communication device #2. In communication device #2 where MIP #2 is present, there are TST frames whose TTL value expires, and the number thereof is equal to that of transmitted TST frames. As a result, there is no failure between communication devices 1 and 2.

From the results of TST #8-1 to TST #8-3, it can be understood that a failure occurs in a direction from communication device 2 to communication device 3 between communication devices 2 and 3.

TST #8-4 is executed from MEP #4 to MEP #1. There is no obstacle in this direction in the section. Accordingly, the TST frame is received by MEP #1. The number of transmitted frames at MEP #4 and the number of received frames at MEP #1 match each other, and it can be understood that there is no failure in End-to-end in a direction from communication device 4 to communication device 1.

When the aforementioned results are taken together, in this example, it can be understood that a failure occurs in the direction from communication device 2 to communication device 3 between communication devices 2 and 3.

Failure place specifying when a two-way obstacle (obstacle in two directions between communication devices 2 and 3) is generated will be described.

Figure 9:
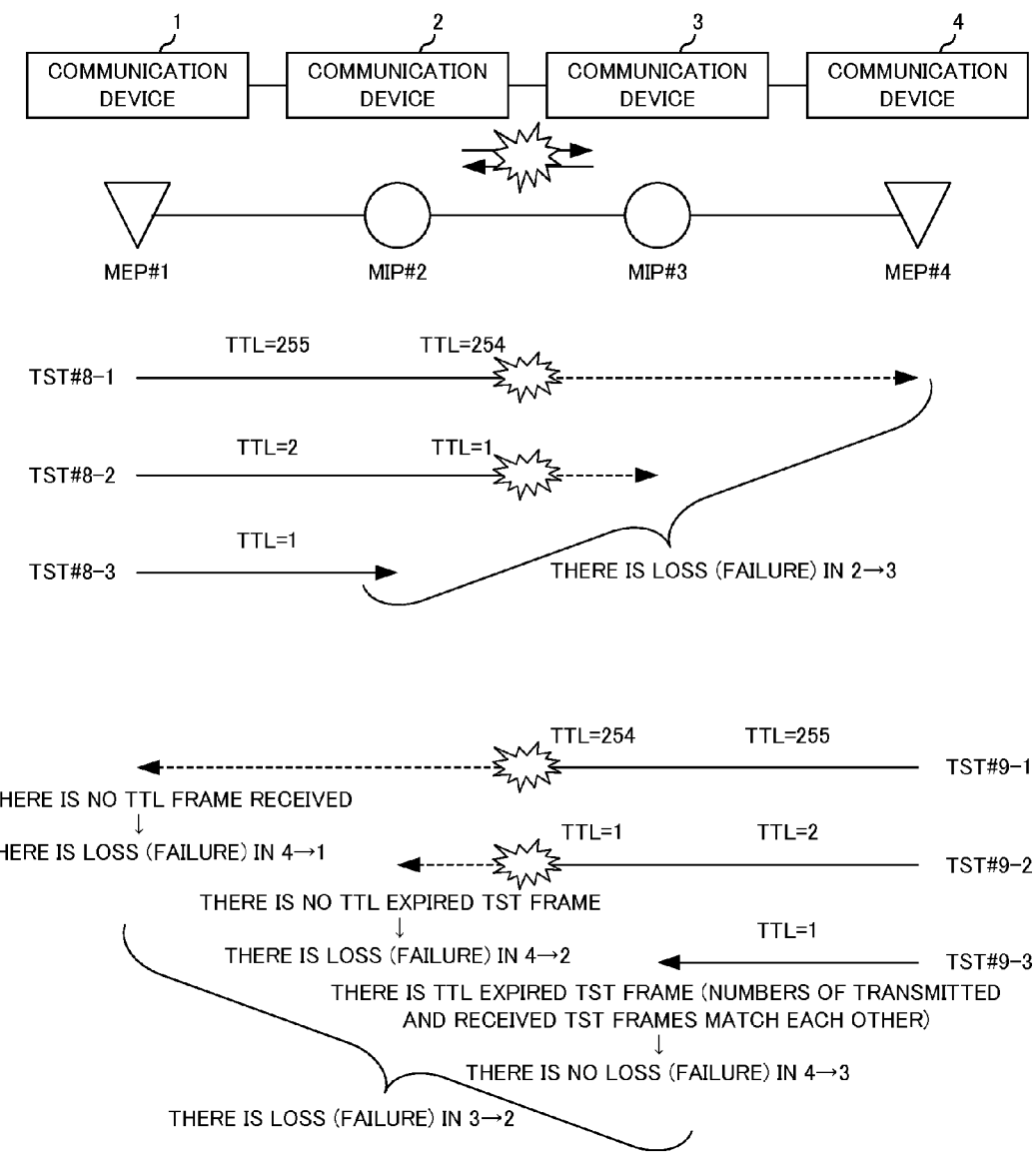
FIG. 9 A diagram showing a failure place specifying state when a two-way failure occurs between communication devices 2 and 3 in the network shown in FIG. 2.

FIG. 9 is a diagram showing a failure place specifying state when a two-way obstacle is generated between communication devices 2 and 3 in the network shown in FIG. 2.

Through the same procedure as that described above referring to FIG. 8, it can be understood that there is a failure in a direction from communication device 2 to communication device 3 between communication devices 2 and 3 . . . (A) Similarly, in a direction from communication device 4 to communication device 1, the followings are executed:

As TST #9-1, TST (TTL = 255) from MEP #4 to MEP #1
As TST #9-2, TST (TTL = 2) from MEP #4 to MIP #2
As TST #9-3, TST (TTL = 1) from MEP #4 to MEP #3

A result is as follows:
In TST#9-1, there is no TST frame received in MEP #1
⇒ there is a failure in communication device 4→communication device 1
In TST#9-2, there is no TST frame whose TTL value has expired in MEP #2
⇒ there is a failure in communication device 4→communication device 2
In TST#9-3, there is TST frame whose TTL value has expired in MEP #4
⇒ there is no failure in communication device 4→communication device 3

From the result of TST #9-1 to TST #9-3, it can be understood that there is a failure in a direction from communication device 3 to communication device 2 between communication devices 2 and 3 . . . (B)

From the results of (A) and (B), it can be understood that there are failures in two ways between communication devices 2 and 3. Accordingly, by transmitting only one TST frame, continuity from the transmission source node to the relay node can be checked based on whether any TST frame whose TTL value has expired has been received.

<Effect>

As described above, according to the present invention, in the transmission source MEP, the number of hops that is counted until the destination MIP to be diagnosed is set as the TTL value, and the standard TST frame is transmitted. In the destination MIP of the reception side, the number of TST frames whose TTL value has expired is counted, and a difference between the numbers of transmitted and received frames is checked by the external device or the like. This enables checking of continuity at the TST transmission rate in the direction from the transmission source MEP to the destination MIP. This checking can be carried out by presenting the numbers of transmitted and received frames (outputting such as displaying), or performing predetermined calculation for the numbers of transmitted and received frames and calculating a continuity state to present it. By utilizing the feature in which continuity can be checked in one way between the MEP and a given MIP, specifying of a failure place including a failure place in one way can be realized. Thus, more meticulous monitoring is enabled even in compliance with the standard. The output destination of the number of transmitted frames, the diagnostic frame whose TTL value has expired, and the number of received frames is not limited to the external device but can be any one of communication devices 1 to 4. In such a case, based on the numbers of such frames, by checking the difference, continuity at the TST transmission rate is checked in a direction from the MEP to the MIP between a transmission source MEP and a destination input side/output side MIP. This checking is carried out by the device which has received the numbers.

Second Embodiment

The other embodiment of the present invention will be described with reference to the drawings.

The first embodiment is premised on the configuration where MIP is set for each node (to be exact, operated only on input line card side). In a second embodiment, the present invention, in a configuration where MIP is set for each interface (set in input side and output side line cards), will be described. Thus, a monitoring section can be set more meticulously.

<Description of Configuration>

Figure 10:
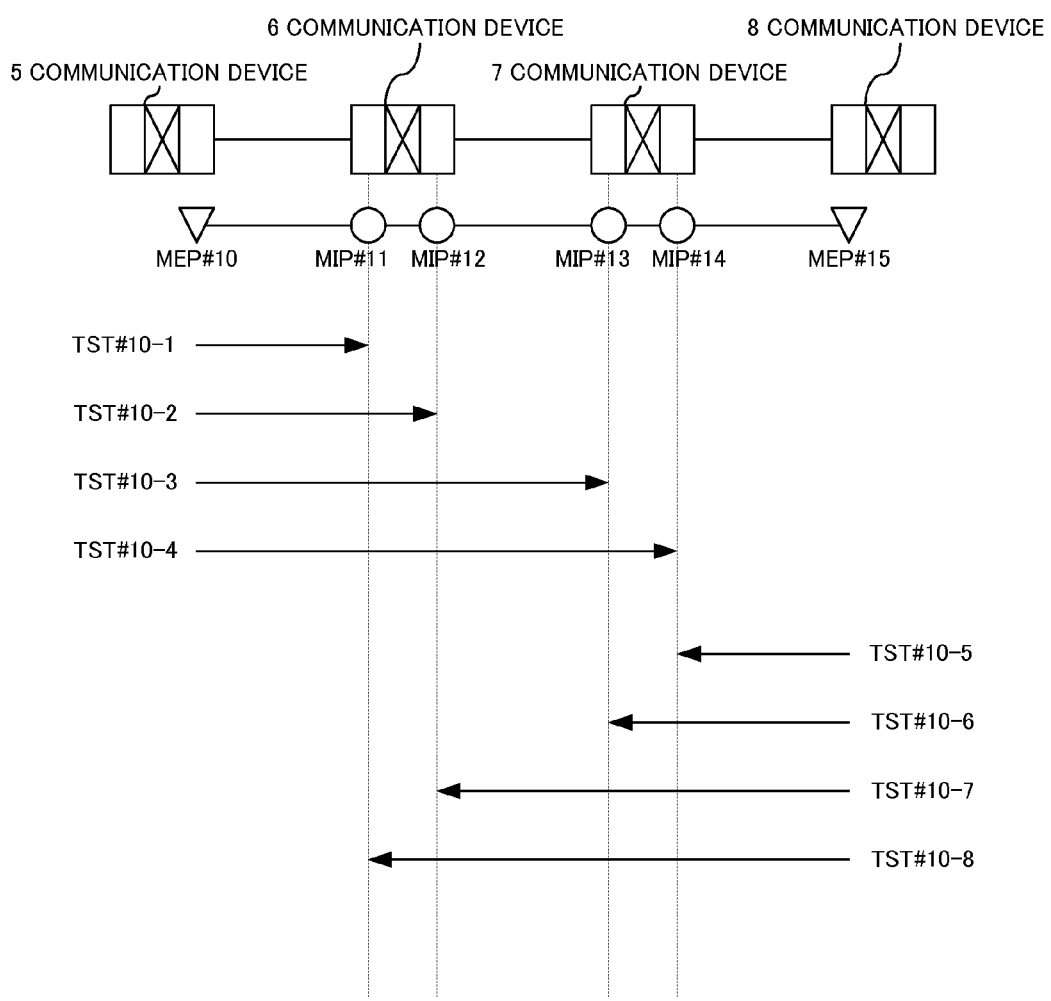
FIG. 10 A diagram showing an example of a diagnostic network and a monitoring section where a TST function is executed according to a second embodiment.

FIG. 10 is a diagram showing an example of a diagnostic network and a monitoring section where a TST function is executed according to the first embodiment.

In this embodiment, as shown in FIG. 10, as compared with the first embodiment shown in FIG. 2, MIPs in relay communication devices 6 and 7 are respectively set as MIPs #11, #12, #13, and #14 in input line cards and output line cards. In FIG. 10, in a TST function from the MEP to the MIP according to the present invention, MEP #10 is set as a transmission source, TST #10-1, TST #10-2, TST #10-3, TST #10-4, and MEP #15 where respective MIPs are destinations are set as transmission sources, and TST #10-8, TST #10-7, TST #10-6, and TST #10-5 where respective MIPs are destinations are executed. TST #10-1, 2 are transmitted as one TST frame from MEP #10 (similar for TST #10-3, 4). Similarly, TST #10-5, 6 are transmitted as one TST frame from MEP #15 (similar for TST #10-7, 8).

Figure 11:
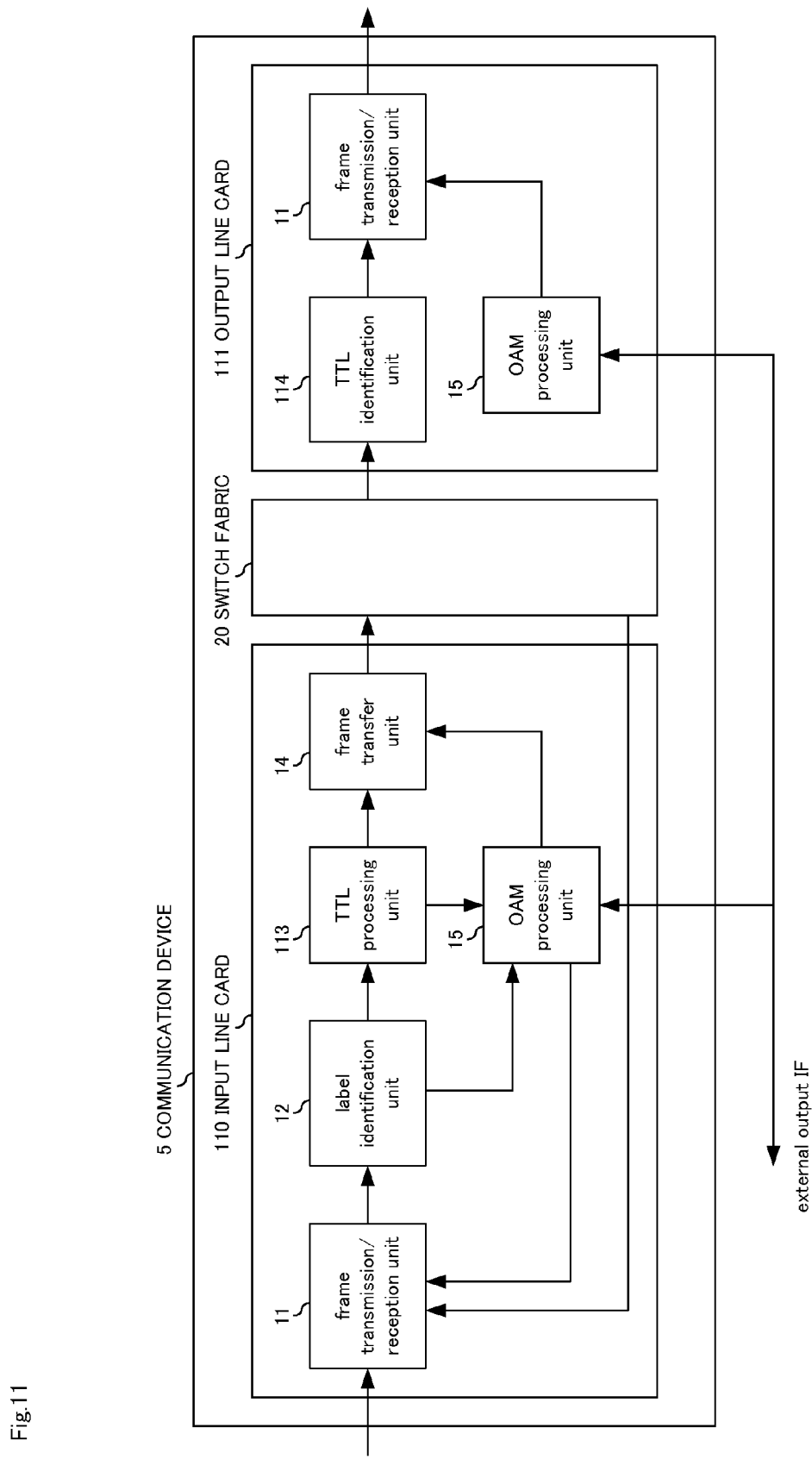
FIG. 11 A diagram showing an example of the internal configuration of a communication device shown in FIG. 10.

FIG. 11 is a diagram showing an example of the internal configuration of communication device 5 shown in FIG. 10. The internal configurations of communication devices shown in FIG. 10 are similar to that shown in FIG. 11.

In communication device 5 shown in FIG. 10, as compared with communication device 1 shown in FIG. 3, TTL processing unit 13 is TTL processing unit 113 in input line card 110, and TTL identification unit 114 is added in output line card 111.

TTL processing unit 113 is different from TTL processing unit 13 shown in FIG. 3 in treatment of an OAM frame of TTL=0. TTL processing unit 13 transfers the OAM frame of TTL=0 to OAM processing unit 15. However, TTL processing unit 113 transfers the OAM frame of TTL=0 to both OAM processing unit 15 and frame transfer unit 14. The other operations of TTL processing unit 113 are similar to those of TTL processing unit 13.

TTL identification unit 114 reads the TTL values of frames received from switch fabric 20, determines whether the frames are TST frames in the case of TTL=0, counts the number of TST frames, and discards the received TST frames. TTL identification unit 114 transfers a frame where TTL is not "0" to frame transmission/reception unit 11.

<Description of Operation>

Hereinafter, processing in TTL processing unit 113 and TTL identification unit 114 shown in FIG. 11 will be described. In this case, by using the form shown in FIG. 10, the device configuration diagram shown in FIG. 11, and a flowchart, the operations of the transmission processing, the relay processing, and the reception processing of TST #10-4 (TST execution from MEP #10 of communication unit 5 through MIP #11, 12 of communication device 6 and MIP #13 of input line card of communication device 7 to MIP #14 of output line card) shown in FIG. 10 will be described focusing on differences from the processing in the first embodiment.

Figure 12:
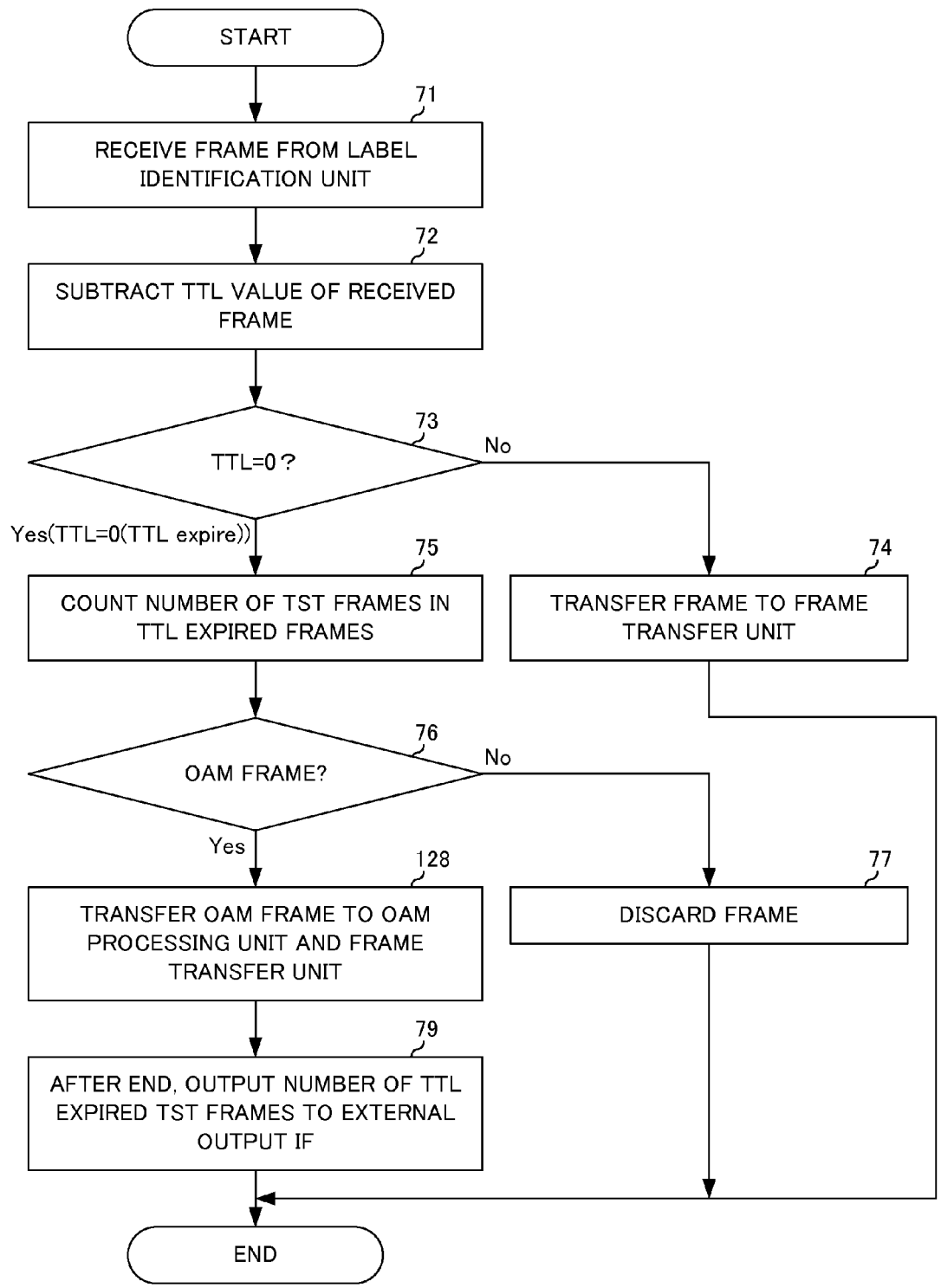
FIG. 12 A flowchart illustrating processing in a TTL processing unit shown in FIG. 11.

FIG. 12 is a flowchart illustrating processing in TTL processing unit 113 shown in FIG. 11.

(e) TST Frame Transmission Operation (MEP #10 of Communication Device 5)

A TST frame transmission operation is similar to that of the first embodiment. OAM processing unit 15 of communication device 5 (MEP #10) transmits a TST frame according to the operation flow described above referring to FIG. 5. For a TTL value set in step 52, "2" that is the number of hops that is counted until communication device 7 where destination MIP #14 is present is designated (TTL value is subtracted only on input line card side, and thus TTL value until destination device is not changed even when MIP is present in output line card).

(f) TST Frame Relay Operation (Communication Device 6)

A TST frame relay operation is also similar to that of the first embodiment. In this case, the TTL value of a TST frame is subtracted to "1" to be transferred to communication device 7.

(g) TST Frame Reception Operation (MIP #13 of Input Line Card and MIP #14 of Output Line Card of Communication Device 7)

In input line card 110 (MIP #13) of communication device 7, the operation of TTL processing unit 113 is different from the reception operation of the first embodiment.

In step 71, TTL processing unit 113 receives a frame from label identification unit 12. In step 72, TTL processing unit 13 executes subtraction from the TTL value of the received frame. The TTL value of the received frame is "1", and thus a new TTL value is "0".

In the conditional branching of step 73, the TTL value of the frame is "0", and TTL value has expired. Thus, TTL processing unit 113 executes processing of step 75.

In step 75, TTL processing unit 113 counts, among the frames whose TTL value has expired, the number of TST frames from presence of GAL labels, ACH headers, and information of OAM PDU.

Then, in the conditional branching of step 76, when the frame whose TTL value has expired is an OAM frame, TTL processing unit 113 proceeds to step 128.

On the other hand, in the conditional branching of step 76, when the frame whose TTL value has expired is not an OAM frame, in step 77, TTL processing unit 113 discards the frame.

In this case, the frame is a TST frame, and an OAM frame, and thus TTL processing unit 113 executes processing of step 128.

In step 128, TTL processing unit 13 transfers the OAM frame whose TTL value has expired to OAM processing unit 15 and frame transfer unit 14.

The transfer to frame transfer unit 14 is the difference between TTL processing unit 13 of the first embodiment and TTL processing unit 113. Concerning the TST frame, it is not necessary for OAM processing unit 15 to carry out a processing operaton. Thus, TTL processing unit 113 does not need to transfer the frame except to frame transfer unit 14.

In step 79, TTL processing unit 113 ends the counting of TST frames whose TTL value has expired when it receives a TST end trigger such as the passage of designated end time (e.g., designated at TST start time) or reception of a TST end instruction from the external output IF.

Then, TTL processing unit 113 outputs the counted number of TST frames to an external device such as the external output IF, an operating system or a memory. This output result is a TST result that is tested until MIP #13 of the input line card.

Next, the TST frame reception unit of TTL identification unit 114 of output line card 111 newly added in the second embodiment will be described.

Figure 13:
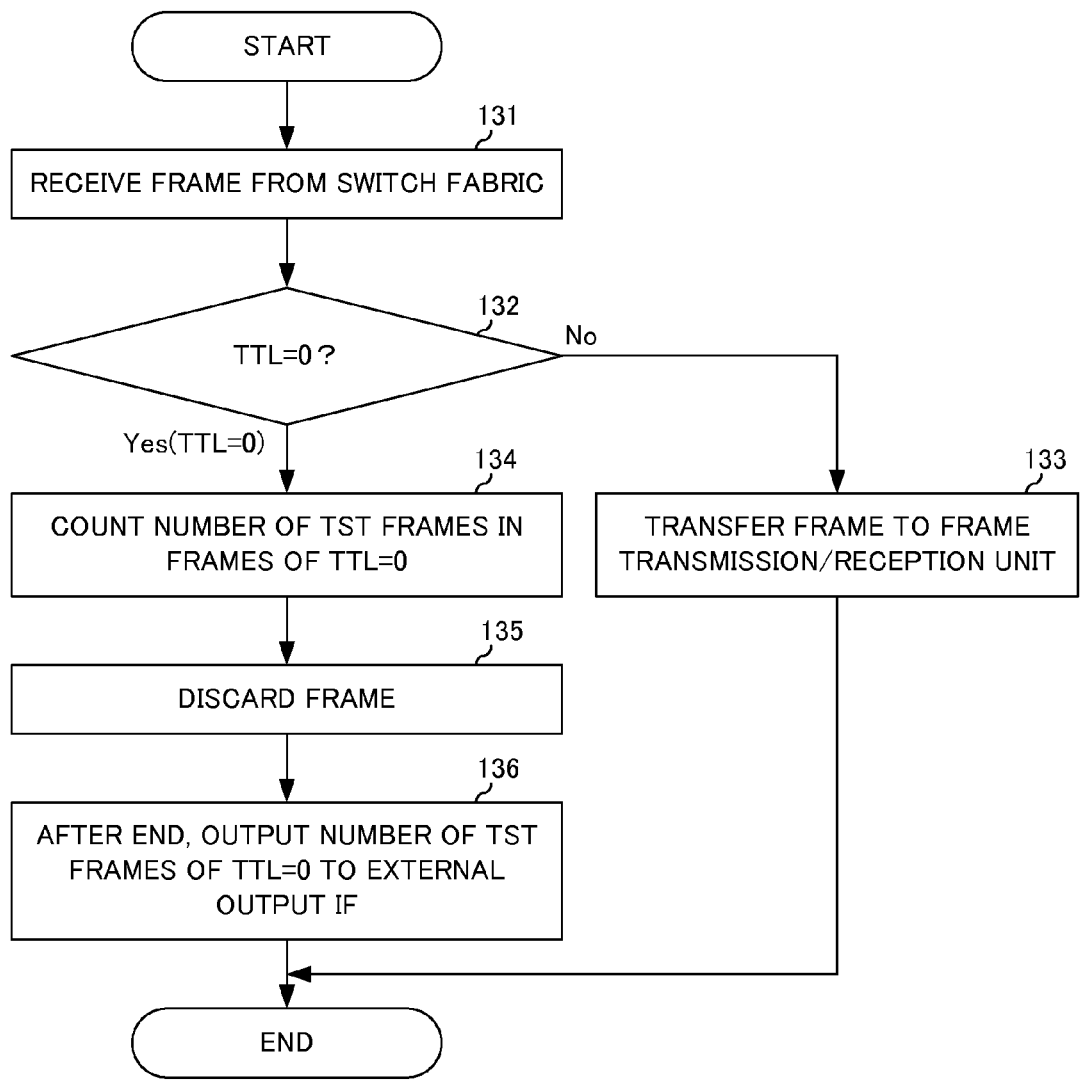
FIG. 13 A flowchart illustrating processing in a TTL identification unit shown in FIG. 11.

FIG. 13 is a flowchart illustrating processing in TTL identification unit 114 shown in FIG. 11.

In step 131, TTL identification unit 114 receives a frame from switch fabric 20. In step 132, TTL identification unit 114 determines whether the TTL value of the received frame is "0".

When the TTL value is not "0", in step 133, TTL identification unit 114 transfers the frame to frame transmission/reception unit 11.

On the other hand, when the TTL value is "0", in step 134, TTL identification unit 114 counts, among the frames of TTL=0, the number of TST frames from presence of GAL labels, ACH headers, and information of OAM PDU.

Then, in step 135, TTL identification unit 114 discards the received frames of TTL=0.

In step 136, TTL identification unit 114 ends the counting of TTL expired TST frames of TTL=0 when it receives a TST end trigger such as the passage of designated end time (e.g., designated at TST start time) or reception of a TST end instruction from the external output IF. Then, TTL identification unit 114 outputs the counted number of frames as the number of checked frames to the external output IF, the operating system or the memory. This output result is a TST result that is tested until MIP #14 of output line card 111.

By comparing the counting result of step 79 and the counting result of step 136 with the number of transmitted TST frames, continuity from transmission source MEP #10 to destination MIP #13 or MIP #14 can be checked.

Thus, according to the embodiment, as the transmission operation, in the transmission source MEP, the TTL value is set to the number of hops that is counted until the destination MIP, and the TST frame compliant with the standard is transmitted. As the reception operation, the TST frame whose TTL value has expired is terminated in the input line card and transferred to the output line card. By counting the numbers of TST frames of TTL=0 in the input line card and the output line card, TST can be executed from the MEP to the MIPS of both the input line card side and the output line card side. As described above, the TST frames to be transmitted are compliant with the standard. No processing operation undefined by the standard is executed in the MIP, and processing can be achieved under conditions compliant with the standard.

Hereinafter, a specific example of the diagnostic function of a monitoring section using the TST function of the present invention will be described. In this case, (2) failure place checking in one way described above in the first embodiment will be described.

Figure 14:
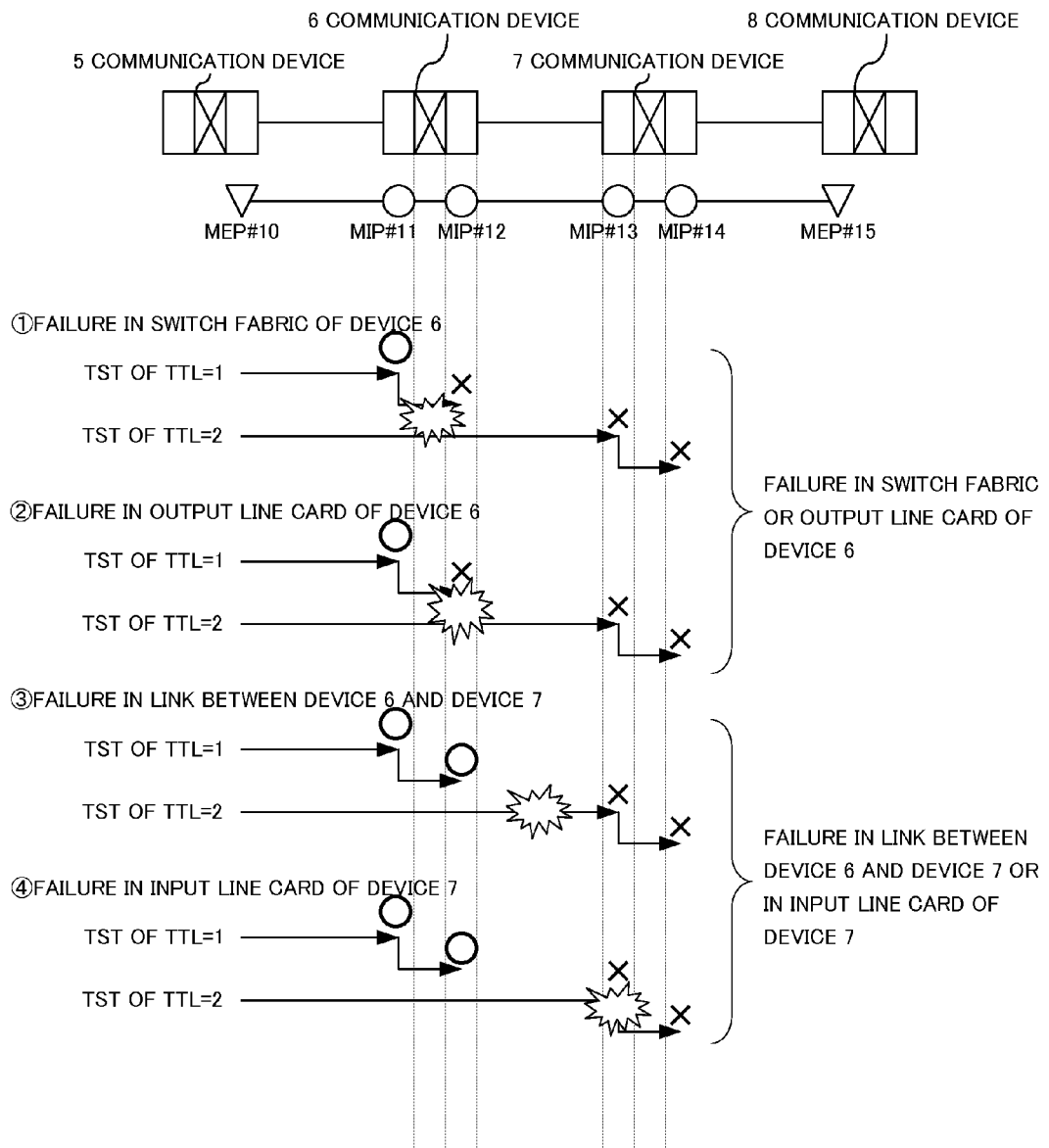
FIG. 14 A diagram showing an example of a failure place specifying state when a one-way obstacle is generated between communication devices 6 and 7 in the network shown in FIG. 10.

FIG. 14 is a diagram showing an example of a failure place specifying state when a one-way obstacle is generated between communication devices 6 and 7 in the network shown in FIG. 10. Failure places are different among (1) to (4) as follows:

(1) failure in switch fabric of communication device 6
(2) failure in output side line card of communication device 6
(3) failure in link between communication devices 6 and 7
(4) failure in input line card of communication device 7

In (1) and (2), when TST frames of TTL=1 and TTL=2 are transmitted from MEP #10 of transmission source communication device 5, the TST frame of TTL=0 is received in the input line card (MIP #11) of communication device 6, while no TST frame of TTL=0 is received in the output line card (MIP #12) of communication device 6 and the input line card (MIP #13) and the output line card (MIP #14) of communication device 7. As a result, in this example, it can be understood that there is a failure in switch fabric 20 or output line card 111 of communication device 6.

In (3) and (4), when TST frames of TTL=1 and TTL=2 are transmitted from MEP #10 of transmission source communication device 5, the TST frame of TTL=0 is received in the input line card (MIP #11) and the output line card (MIP #12) of communication device 6, while no TST frame of TTL=0 is received in the input line card (MIP #13) and the output line card (MIP #14) communication device 7. As a result of this diagnosis, it can be understood that there is a failure in link between communication devices 6 band 7 or in input line card 110 of communication device 7.

In the failures of (3) and (4), in the first embodiment, the reception of the frame of TTL=0 by MIP #12 of the output line card of communication device 6 cannot be known. This disables specifying the absence of failures in switch fabric 20 and output line card 111 of communication device 6. On the other hand, in the second embodiment, the MIP is disposed in the output line card to enable reception determination of the frame of TTL=0. Thus, failure places can be specified within a narrow range.

<Effect>

As described above, according to the second embodiment, the MIPs are individually arranged on the input side and the output side, in the transmission source MEP, the number of hops that is counted until the destination MIP to be diagnosed is set as the TTL value, and the standard TST frame is transmitted. In the MIP of the input line card of the reception side, the number of TST frames whose TTL value has expired is counted to be transferred to the output line card. In the MIP of the output line card, the TST frames of TTL=0 is counted. As a result, by checking the difference between the numbers of transmitted and received frames by the external device or the like, continuity at a TST transmission rate in a direction from the MEP to the MIP between the transmission source MEP and the destination input side/output side MIP can be checked. This checking can be carried out by presenting the numbers of transmitted and received frames (outputting such as displaying), or performing predetermined calculation for the numbers of transmitted and received frames and calculating a continuity state to present it. By utilizing the feature in which continuity can be checked in one way between the MEP and a given MIP, specifying a failure place including a failure place in one way can be realized. Thus, more meticulous monitoring is enabled even in compliance with the standard. The output destination of the number of transmitted frames, the diagnostic frame whose TTL value has expired, and the number of received frames is not limited to the external device but can be any one of communication devices 6 to 8. In such a case, based on the numbers of such frames, by checking the difference, continuity at the TST transmission rate is checked in the direction from the MEP to the MIP between the transmission source MEP and the destination input side/output side MIP. This checking is carried out by the device which has received the numbers.

In the first embodiment and the second embodiment, the number of transmitted diagnostic frames transmitted from the transmission source node is counted by OAM processing unit 15 of the transmission source node to be output to the external output IF. However, the number of transmitted diagnostic frames can be counted by other methods to be output to the external output IF.

For example, a sequence number (SN) stored in OAM PDU 44 of the TST frame can be used. In this case, a value preset in the SN of a TST frame to be transmitted first from the transmission source node after the start of TST (e.g., with initial value of mechanism for adding SN to TST frame set to "0", "1" is set in SN of TST frame to be transmitted first) to transmit the frame. Then, by referring to SN stored in a TST frame to be subsequently transmitted at the relay node of the reception side, the number of transmitted frames can be checked based on the SN on the reception side. The number of transmitted frames checked on the reception side can be output to the external output IF. Needless to say, the preset SN is a value recognized beforehand on the reception side.

The processing performed by the component included in each of communication devices 1 to 8, input line cards 10 and 110, and output line cards 30 and 111 (hereinafter, referred to as devices) can be performed by a logic circuit prepared according to each purpose. A computer program (hereinafter, referred to as program) describing the procedure of processing contents can be recorded in a recording medium readable by each device. The program recorded in the recording medium can be read by each device to be executed. The recording medium readable by each device is a movable recording medium such as a floppy (registered trademark) disk, a magneto-optical disk, a DVD, or a CD, or a memory such as a ROM or a RAM or a HDD included in the device. The program recorded in the recording medium is read by a CPU (not shown) installed in the device, and the same processing as that described above is performed under control of the CPU. The CPU operates as a computer which executes the program read from the recording medium recording the program.

The embodiments of the present invention have been described. However, the present invention is not limited to the embodiments. Various changes understandable to those skilled in the art can be made to the configuration and the specifics of the present invention.

This application claims priority from Japanese Patent Application No. 2011-204592 filed on Sep. 20, 2011, which is hereby incorporated by reference herein in its entirety.

What is claimed is:

1. A diagnostic system for diagnosing a network in which a transmission source node and a transmission destination node are connected via a relay node, wherein:

the transmission source node is configured to generate diagnostic frames in which the number of hops that is counted until the relay node is set as a Time To Live value and the Time To Live value is stored in a predetermined field, and transmit the diagnostic frames to the relay node; and

19 the relay node is configured to:
include an input line card configured to decrement, on an input interface side of the relay node, when the diagnostic frames are received, the Time To Live value stored in the field of the diagnostic frames, count the number of diagnostic frames in which the decremented Time To Live value is 0, transfer the diagnostic frames, and output the counted number of diagnostic frames as the number of checked frames; and
include an output line card configured to count, on an output interface side of the relay node, among the diagnostic frames transferred from the input line card, the number of diagnostic frames in which the decremented Time To Live value is 0, and output the counted number of diagnostic frames as the number of checked frames; and
check continuity in a direction from the transmission source node to the relay node between the transmission source node and the input line card and between the transmission source node and the output line card based on the number of transmitted diagnostic frames transmitted from the transmission source node, the number of checked frames output from the input line card, and the number of checked frames output from the output line card.

2. The diagnostic system according to claim 1, wherein:
the input line card is configured to output the number of checked frames to the external device;
the output line card is configured to output the number of checked frames to the external device; and
the external device is configured to check continuity in the direction from the transmission source node to the relay node between the transmission source node and the input line card and between the transmission source node and the output line card based on the number of transmitted diagnostic frames, the number of checked frames output from the input line card, and the number of checked frames output from the output line card.

3. A diagnostic system for diagnosing a network, comprising:
a relay node, wherein the relay node is configured to:
decrement, when diagnostic frames transmitted from a transmission source node are received, a Time To Live value stored in a predetermined field of the diagnostic frames;
count the number of diagnostic frames in which a decremented Time To Live value is 0, discard the diagnostic frames, and output the counted number of diagnostic frames as the number of checked frames;
check continuity in a direction from the transmission source node to the relay node between the transmission source node and the relay node based on the number of transmitted diagnostic frames transmitted from the transmission source node and the number of checked frames; and
identify the diagnostic frames based on a Channel Type value of an Associated Channel Header and a value of a predetermined field in Operation Administration and Maintenance Protocol Data Unit.

4. A diagnostic system for diagnosing a network, comprising:
a relay node, wherein the relay node is configured to:
decrement, when diagnostic frames transmitted from a transmission source node are received, a Time To Live value stored in a predetermined field of the diagnostic frames;

20 count the number of diagnostic frames in which a decremented Time To Live value is 0, discard the diagnostic frames, and output the counted number of diagnostic frames as the number of checked frames; and
check continuity in a direction from the transmission source node to the relay node between the transmission source node and the relay node based on the number of transmitted diagnostic frames transmitted from the transmission source node and the number of checked frames,
wherein:
the transmission source node is configured to set a value, after a start of diagnosis, a value preset in a sequence number stored in a diagnostic frame to be transmitted first and transmit the diagnostic frame; and
the relay node is configured to count and output the number of transmitted diagnostic frames by using the sequence number stored in the received diagnostic frame.

5. A relay node for relaying data between a transmission source node and a transmission destination node, comprising:
an input line card configured to decrement, on an input interface side of the relay node, when diagnostic frames transmitted from the transmission source node are received, a Time To Live value stored in a predetermined field of the diagnostic frames, count the number of diagnostic frames in which the decremented Time To Live value is 0, transfer the diagnostic frames, and output the counted number of diagnostic frames; and
an output line card that configured to count, on an output interface side of the relay node, among the diagnostic frames transferred from the input line card, the number of diagnostic frames in which the decremented Time To Live value is 0, and output the counted number of diagnostic frames.

6. An input line card mounted on a relay node for relaying data between a transmission source node and a transmission destination node, and
configured to decrement, on an input interface side of the relay node, when diagnostic frames transmitted from the transmission source node are received, a Time To Live value stored in a predetermined field of the diagnostic frames, count the number of diagnostic frames in which the decremented Time To Live value is 0, transfer the diagnostic frames, and output the counted number of diagnostic frames.

7. A diagnostic method for diagnosing a network in which a transmission source node and a transmission destination node are connected via a relay node, the method comprising:
the transmission source node generating diagnostic frames in which the number of hops that is counted until the relay node is set as a Time To Live value and the Time To Live value is stored in a predetermined field;
the transmission source node transmitting the diagnostic frames to the relay node;
the relay node decrementing, on an input interface side, when the diagnostic frames are received, the Time To Live value stored in the field of the diagnostic frames;
the relay node counting the number of diagnostic frames in which the decremented Time To Live value is 0;
the relay node transferring the diagnostic frames in which the decremented Time To Live value is 0;
the relay node outputting the counted number of diagnostic frames as the number of checked frames;
the relay node counting, on an output interface side of the relay node, among the diagnostic frames transferred from the input interface side, the number of diagnostic frames in which the Time To Live value is 0;

the relay node outputting the number of diagnostic frames counted on the output interface side as the number of checked frames; and checking continuity in a direction from the transmission source node to the relay node between the transmission source node and the input interface side and between the transmission source node and the output interface side based on the number of transmitted diagnostic frames transmitted from the transmission source node, the number of checked frames output from the input interface side, and the number of checked frames output from the output interface side.

8. The diagnostic system according to claim 1, wherein:
the transmission source node is configured to transmit one of the diagnostic frames; and
the relay node is configured to check continuity from the transmission source node to the relay node based on whether or not any diagnostic frame in which the Time To Live value is 0 has been received.

9. The diagnostic system according to claim 1, wherein:
the transmission source node is configured to transmit the diagnostic frames at a predetermined rate; and
check continuity from the transmission source node to the relay node at a predetermined rate based on the number of transmitted diagnostic frames and the number of checked frames.

10. The diagnostic system according to claim 1, wherein the relay node configured to identify the diagnostic frame based on a Channel Type value of an Associated Channel Header.

11. The diagnostic system according to claim 1, wherein the relay node is configured to identify the diagnostic frames based on a Channel Type value of an Associated Channel Header and a value of a predetermined field in OAM PDU.

12. The diagnostic system according to claim 1, wherein the transmission source node is configured to count and output the number of transmitted diagnostic frames.

13. The diagnostic system according to claim 1, wherein:
the transmission source node is configured to set a value, after a start of diagnosis, a value preset in a sequence number stored in a diagnostic frame to be transmitted first and transmit the diagnostic frame; and the relay node is configured to count and output the number of transmitted diagnostic frames by using the sequence number stored in the received diagnostic frame.

14. A diagnostic system for diagnosing a network, comprising:
a relay node configured to:
decrement a Time To Live value when diagnostic frames are received, count a first number of diagnostic frames in which a decremented Time To Live value is 0, transfer the diagnostic frames, and output the first counted number of diagnostic frames as a first number of checked frames; and
count, among the transferred diagnostic frames, a second number of diagnostic frames in which the decremented Time To Live value is 0, and output the second counted number of diagnostic frames as a second number of checked frames; and
check continuity based on the number of transmitted diagnostic frames transmitted, the first number of checked frames output, and the second number of checked frames output.

15. A diagnostic method for diagnosing a network, the method comprising:
decrementing, by a relay node, when diagnostic frames are received, a Time To Live value;
counting, by the relay node, a first number of diagnostic frames in which a decremented Time To Live value is 0;
transferring, by the relay node, the diagnostic frames in which the decremented Time To Live value is 0;
outputting, by the relay node, a first counted number of diagnostic frames as a first number of checked frames;
counting, by the relay node, among the diagnostic frames transferred, a second number of diagnostic frames in which the Time To Live value is 0;
outputting, by the relay node, a second number of diagnostic frames as a second number of checked frames; and
checking based on the number of transmitted diagnostic frames transmitted from the transmission source node, the first number of checked frames output, and the second number of checked frames output.

* * * * *